United States Patent
Iida

(10) Patent No.: US 7,599,143 B2
(45) Date of Patent: Oct. 6, 2009

(54) INFORMATION RECORDING/REPRODUCTION APPARATUS, HEAD LEVITATION HEIGHT CONTROL METHOD AND HEAD LEVITATION CONTROL CIRCUIT

(75) Inventor: Atsuo Iida, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 107 days.

(21) Appl. No.: 11/504,589

(22) Filed: Aug. 16, 2006

(65) Prior Publication Data

US 2007/0247739 A1    Oct. 25, 2007

(30) Foreign Application Priority Data

Apr. 21, 2006    (JP)    ............................. 2006-118041

(51) Int. Cl.
 *G11B 21/02*    (2006.01)
(52) U.S. Cl. ....................................................... 360/75
(58) Field of Classification Search .................. 360/75, 360/31, 59, 97.02, 53, 25, 46, 69, 264.4, 360/294.7; 29/603.08
See application file for complete search history.

(56) References Cited

U.S. PATENT DOCUMENTS

| | | | |
|---|---|---|---|
| 5,377,058 A | | 12/1994 | Good et al. |
| 5,831,781 A | * | 11/1998 | Okamura .................... 360/31 |
| 5,974,657 A | * | 11/1999 | Fox et al. ................. 29/603.08 |
| 6,057,975 A | * | 5/2000 | Yaeger et al. ................ 360/75 |
| 6,101,054 A | | 8/2000 | Tsunoda ...................... 360/46 |
| 6,125,008 A | * | 9/2000 | Berg et al. ............... 360/264.4 |
| 6,266,199 B1 | * | 7/2001 | Gillis et al. .................. 360/31 |
| 6,310,747 B1 | * | 10/2001 | Emo et al. ............... 360/97.02 |
| 6,411,458 B1 | * | 6/2002 | Billings et al. .............. 360/75 |
| 6,525,891 B1 | * | 2/2003 | Tsunoda ...................... 360/25 |
| 6,760,181 B2 | * | 7/2004 | Li et al. ....................... 360/75 |
| 6,992,850 B2 | * | 1/2006 | Nishiyama ................... 360/75 |
| 7,023,647 B2 | | 4/2006 | Bloodworth et al. |
| 7,180,692 B1 | * | 2/2007 | Che et al. .................... 360/31 |

(Continued)

FOREIGN PATENT DOCUMENTS

CN    1090078 A    7/1994

(Continued)

OTHER PUBLICATIONS

Chinese Office Action mailed Apr. 24, 2009 regarding Chinese App. No. 200610152111.X. An English-language translation is provided.

*Primary Examiner*—Fred Tzeng
(74) *Attorney, Agent, or Firm*—Greer, Burns & Crain, Ltd.

(57) ABSTRACT

There is provided an information recording/reproduction apparatus, a head levitation height control method, and a head levitation control circuit capable of adequately controlling a head levitation height.

An information recording/reproduction apparatus having a head 41 that performs recording or reproduction of information on/from a recording medium, comprises: a drive section 43a that changes the levitation height of the head 41 relative to the recording medium based on a first drive method; a drive section 43b that changes the levitation height of the head 41 relative to the recording medium based on a second drive method different from the first drive method; a levitation height measurement section that measures the levitation height of the head 41; and a controller that controls the drive sections 43a and 43b based on the head levitation height measured by the levitation height measurement section.

21 Claims, 7 Drawing Sheets

U.S. PATENT DOCUMENTS

| | | | |
|---|---|---|---|
| 7,187,514 B2 * | 3/2007 | Takagi et al. | 360/75 |
| 7,215,495 B1 * | 5/2007 | Che et al. | 360/31 |
| 7,292,401 B2 * | 11/2007 | Shen et al. | 360/69 |
| 7,430,098 B1 * | 9/2008 | Song et al. | 360/294.7 |
| 7,457,069 B2 * | 11/2008 | Yoshioka et al. | 360/75 |
| 2006/0028754 A1 * | 2/2006 | Suk | 360/75 |
| 2006/0119974 A1 * | 6/2006 | Yamazaki et al. | 360/75 |
| 2006/0158769 A1 * | 7/2006 | Ono et al. | 360/75 |
| 2007/0146920 A1 * | 6/2007 | Kitamura et al. | 360/53 |
| 2007/0230001 A1 * | 10/2007 | Imamura et al. | 360/31 |

FOREIGN PATENT DOCUMENTS

| | | |
|---|---|---|
| CN | 1619649 A | 5/2005 |
| JP | 61-113117 | 5/1986 |
| JP | 61-172285 | 8/1986 |
| JP | 62-250570 | 10/1987 |
| JP | 5-20635 | 1/1993 |
| JP | 5-347078 | 12/1993 |
| JP | 2004-241092 | 8/2004 |

* cited by examiner

INFORMATION RECORDING/REPRODUCTION APPARATUS, HEAD LEVITATION HEIGHT CONTROL METHOD AND HEAD LEVITATION CONTROL CIRCUIT

BACKGROUND OF THE INVENTION

1. Field of the Invention

The present invention relates to an information recording/reproduction apparatus, a head levitation height control method, and a head levitation control circuit that control a head levitation height relative to a recording medium.

2. Description of the Related Art

In a magnetic disk apparatus, a slider incorporating a magnetic head uses the airflow caused by disk rotation to levitate in the very vicinity of the disk surface. As the levitation height is reduced, sensitivity becomes higher as well as unnecessary broadening of a magnetic field can be suppressed. Therefore, the reduction in levitation height of the slider is indispensable for increasing the capacity of a magnetic disk apparatus.

Currently, along with advancement in design improvement of a levitation surface and slider processing technique, a head levitation height is reduced to about 10 nm. However, improvement in terms of design is being pushed to the limit and it is necessary to perform active control of the levitation height for further reduction in the levitation height.

As prior arts relating to the present invention, there are known the following methods: a method that applies a current to a heat element resistor provided in a head portion to deform the head portion due to generated heat to thereby reduce the levitation height (projecting the head) (refer to, e.g., Jpn. Pat. Appln. Laid-Open Publication No. 5-20635 (Patent Document 1)); a method that applies heat to the resistor, like the method of above Patent Document 1, to increase the levitation height (reduce the projecting amount of the head) (refer to, e.g., Jpn. Pat. Appln. Laid-Open Publication No. 2004-241092 (Patent Document 2)); a method that applies a voltage to a piezoelectric element provided on the back surface of the slider to warp the back surface of the slider to thereby increase the levitation height (refer to, e.g., Jpn. Pat. Appln. Laid-Open Publications Nos. 62-250570 and 5-347078 (Patent Documents 3 and 4)); an electrostatic levitation method that utilizes Coulomb's force to change the head levitation height (refer to, e.g., Jpn. Pat. Appln. Laid-Open Publication No. 61-113117 (Patent Document 5)); and a method that deforms a suspension supporting the slider to change the head levitation height (refer to, e.g., Jpn. Pat. Appln. Laid-Open Publication No. 61-172285 (Patent Document 6)).

However, a method such as one disclosed in the above Patent Document 1, 2, or 5 can change the levitation height by at most 5 nm. Further, the method of Patent Document 1 can reduce the levitation height, but cannot increase it. Similarly, the methods of Patent Documents 2, 3, and 4 can increase the levitation height but cannot reduce it.

In a method like Patent Document 1 or 2, in which deformation due to generated heat is utilized, applied current and deformation amount are proportional to each other, so that a power consumption corresponding to the deformation amount is always required in order to maintain a given levitation height. This power consumption is a serious problem for portable-use applications in which power consumption is severely restricted. In a method like Patent Document 1, 2, or 6, it is impossible to change the levitation height at high speed. For example, in the methods of Patent Documents 1 and 2, a time delay from several tens of ms to several hundreds of ms is inevitable in terms of time constant of heat conduction. In the method using the heat deformation, it is impossible to follow the high speed levitation change caused due to waviness of the disk surface.

SUMMARY OF THE INVENTION

The present invention has been made to solve the above problems, and an object thereof is to provide an information recording/reproduction apparatus, a head levitation height control method, and a head levitation control circuit capable of adequately controlling the head levitation height.

To solve the above problems, according to a first aspect of the present invention, there is provided an information recording/reproduction apparatus having a head that performs recording or reproduction of information on/from a recording medium, comprising: a first drive section that changes the levitation height of the head relative to the recording medium based on a first drive method; a second drive section that changes the levitation height of the head relative to the recording medium based on a second drive method different from the first drive method; a levitation height measurement section that measures the head levitation height; and a controller that controls the first and second drive sections based on the head levitation height measured by the levitation height measurement section.

In the information recording/reproduction apparatus according to the present invention, the levitation height measurement section measures the levitation height based on a reproduction signal level output from the head.

In the information recording/reproduction apparatus according to the present invention, the controller controls the first drive section or second drive section to correct a variation of the levitation height due to a production variation of the head and a slider in which the head is provided.

In the information recording/reproduction apparatus according to the present invention, the controller controls the first drive section or second drive section to increase the levitation height by a predetermined level outside read/write operation time.

In the information recording/reproduction apparatus according to the present invention, the controller controls the first drive section or second drive section to correct a variation of the levitation height due to a variation of atmospheric pressure.

In the information recording/reproduction apparatus according to the present invention, the controller controls the first drive section or second drive section to correct a variation of the levitation height due to a variation of the head position in the disk radial direction.

In the information recording/reproduction apparatus according to the present invention, the controller controls the first drive section or second drive section to correct a variation of the levitation height due to impact applied to the information recording/reproduction apparatus.

In the information recording/reproduction apparatus according to the present invention, waviness of various cycles exists on the surface of the disk, and the controller allows the first drive section to follow waviness having a cycle of a first given range and allows the second drive section to follow waviness having a cycle of a second given range which is smaller than the first given range.

In the information recording/reproduction apparatus according to the present invention, the first drive section is so deformed as to reduce the levitation height of the head, and the second drive section is so deformed as to increase the levitation height of the head.

According to a second aspect of the present invention, there is provided a head levitation height control method that controls the levitation height of a head that performs recording or reproduction of information on/from a recording medium, comprising: a levitation height measurement step that measures the head levitation height; and a control step that controls the head levitation height relative to the recording medium based on a first drive method as well as controls the head levitation height relative to the recording medium based on a second drive method different from the first drive method.

According to a third aspect of the present invention, there is provided a head levitation control circuit that controls the levitation of a head that performs recording or reproduction of information on/from a recording medium, comprising: a first drive section that changes the levitation height of the head based on a first drive method; a second drive section that changes the levitation height of the head based on a second drive method different from the first drive method; a levitation height measurement section that measures the head levitation height; and a controller that controls the first and second drive sections based on the head levitation height measured by the levitation height measurement section.

According to the present invention, it is possible to adequately control the head levitation height in various situations.

DETAILED DESCRIPTION OF THE PREFERRED EMBODIMENTS

An embodiment of the present invention will be described below with reference to the accompanying drawings.

A configuration of a magnetic disk apparatus (information recording/reproduction apparatus) according to an embodiment of the present invention will first be described.

Figure 1:
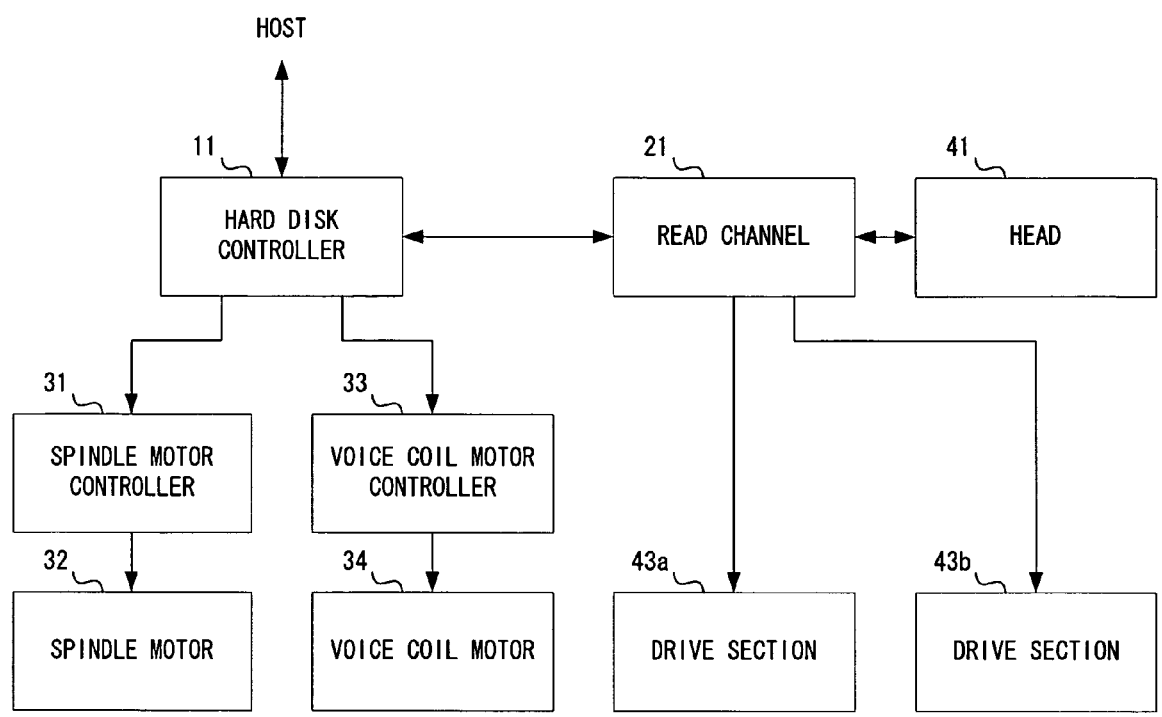
FIG. 1 is a block diagram showing an example of a configuration of a magnetic disk apparatus according to an embodiment of the present embodiment.

FIG. 1 is a block diagram showing an example of a configuration of the magnetic disk apparatus according to the present embodiment. The magnetic disk apparatus shown in FIG. 1 includes a hard disk controller 11, a read channel 21 (controller, levitation height measurement section), a spindle motor controller 31, a spindle motor 32, a voice coil motor controller 33, a voice coil motor 34, a head 41, a drive section 43a (first drive section), and a drive section 43b (second drive section).

Figure 2:
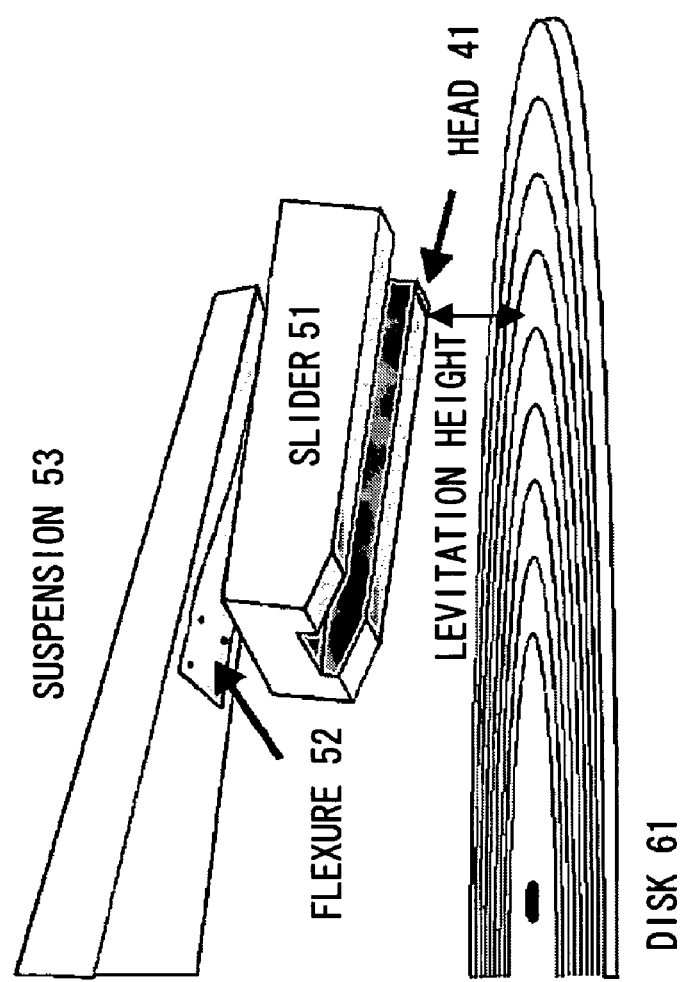
FIG. 2 is a view showing an example of a configuration around a head 41 in the magnetic disk apparatus according to the present embodiment.

FIG. 2 is a view showing an example of a configuration around the head 41 in the magnetic disk apparatus according to the present embodiment. The abovementioned magnetic disk apparatus further includes a slider 51, a flexure 52, a suspension 53, and a disk 61 (recording medium). The slider 51 is fixed to the suspension 53 through the flexure 52. The suspension 53 is mounted on the voice coil motor 34 and is driven by the voice coil motor 34. The disk 61 is placed on the spindle motor 32 and is driven by the spindle motor 32. The slider 51 levitates above the disk 61. The head 41 is provided on the disk 61 side of the slider 51.

The hard disk controller 11 controls the above components according to an instruction from a host as well as exchanges data with the host. The spindle motor controller 31 controls the operation of the spindle motor 32 according to an instruction from the hard disk controller 11. The spindle motor 32 rotates the disk 61. The voice coil motor controller 33 controls the operation of the voice coil motor 34 according to an instruction from the hard disk controller 11. The voice coil motor 34 drives the suspension 53.

The read channel 21 converts data from the hard disk controller 11 into an analog signal and outputs the signal to the head 41 as well as converts an analog signal from the head 41 into data and outputs the data to the hard disk controller 11. Further, the read channel 21 measures the levitation height of the head 41 based on a reproduction signal level output from the head 41 (levitation height measurement step) and controls the drive sections 43a and 43b based on the measurement result (control step), thereby controlling the levitation height of the head 41.

A configuration of the slider 51 will next be described.

Figure 3:
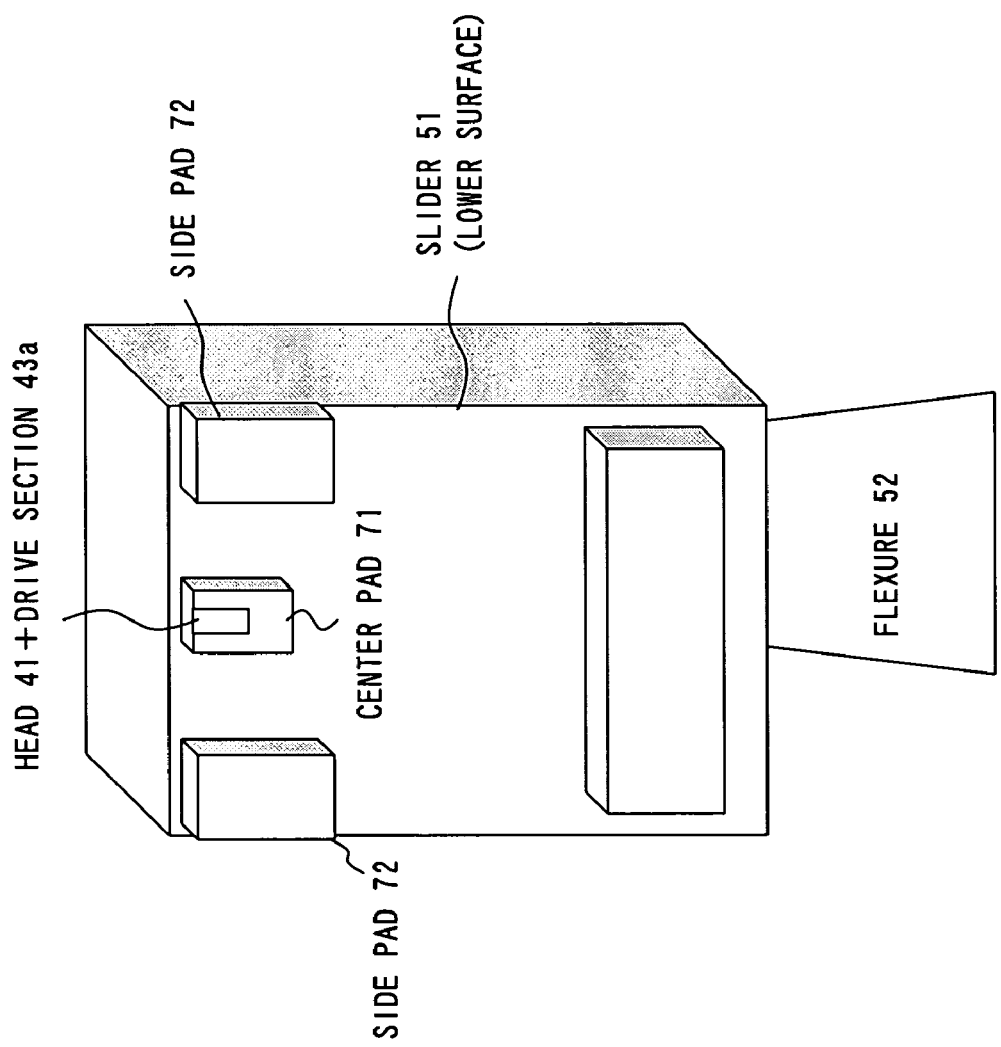
FIG. 3 is a lower surface view showing a first example of a configuration of a slider 51 according to the present embodiment.
Figure 4:
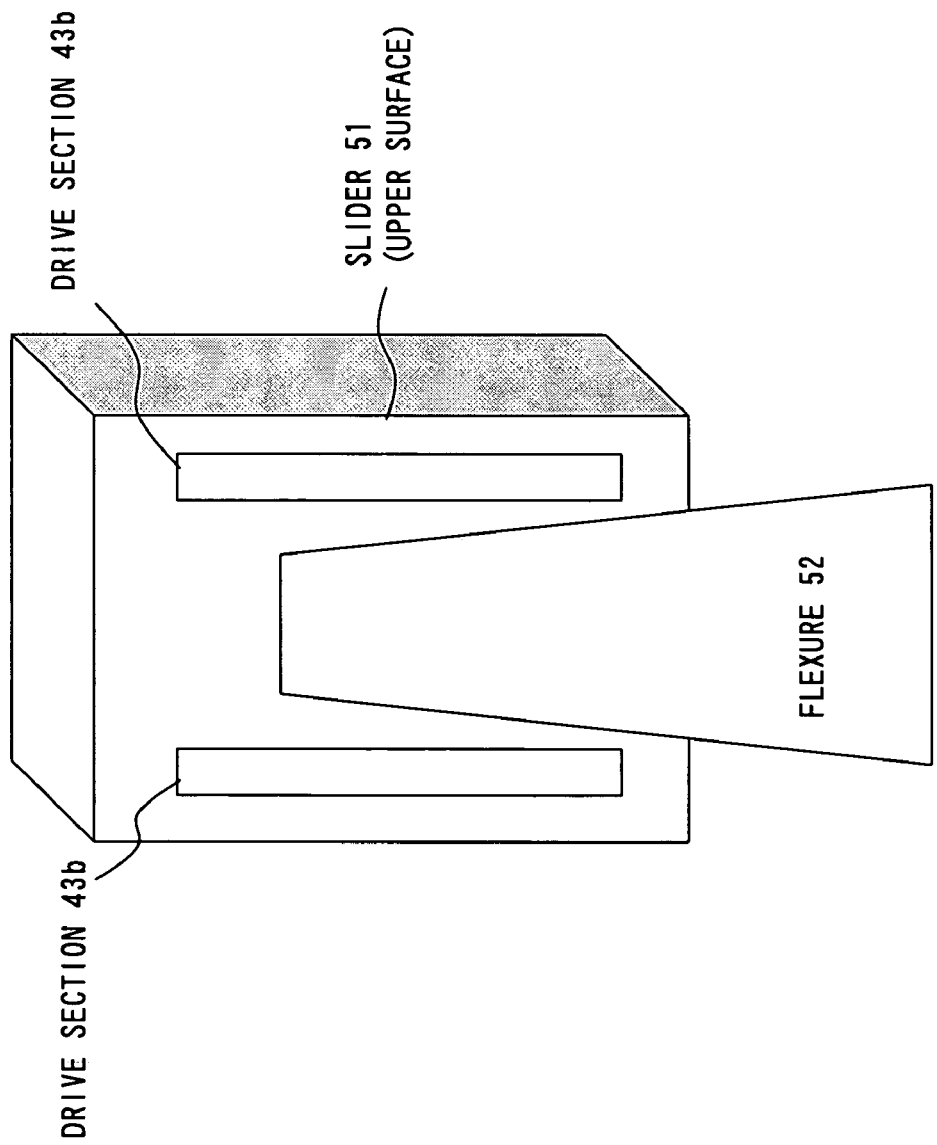
FIG. 4 is an upper surface view showing a first example of a configuration of the slider 51 according to the present embodiment.
Figure 5:
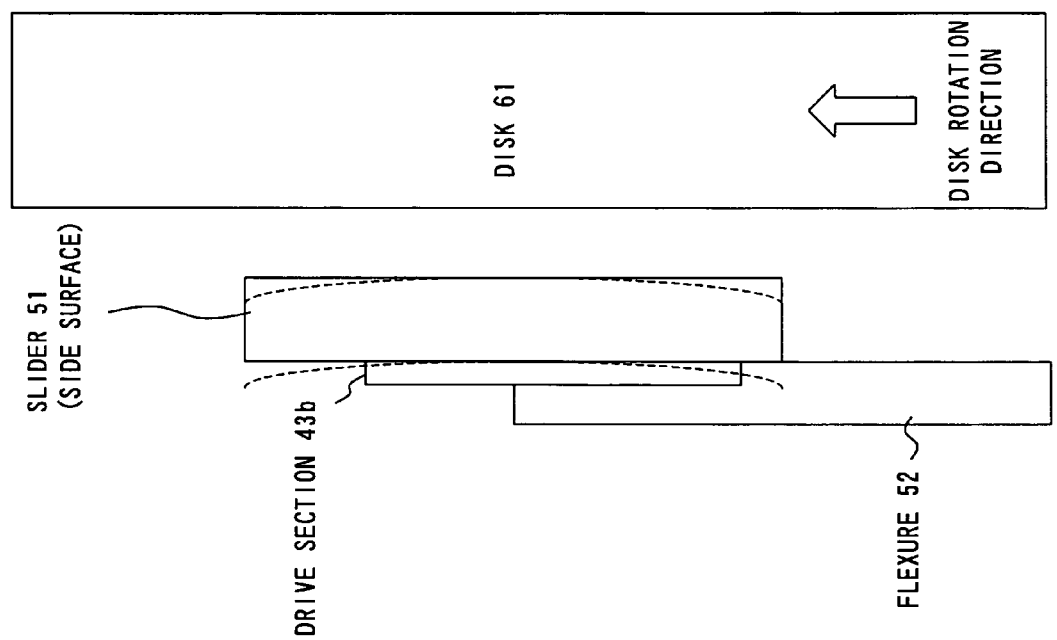
FIG. 5 is a side surface view showing a first example of a configuration of the slider 51 according to the present embodiment.

It is assumed, for the slider 51, that a surface on the disk 61 side is referred to as "lower surface", a surface opposite to the disk 61 is referred to as "upper surface", and other surfaces are referred to as "side surface". In the present embodiment, the drive section 43a is a heater deformed by heat expansion (first drive method) and the drive section 43b is a piezoelectric element deformed by piezoelectric distortion in a flexural mode (second drive method). FIG. 3 is a lower surface view showing a first example of a configuration of the slider 51 according to the present embodiment. The slider 51 has, on the surface on the disk 61 side, one center pad 71 and two side pads 72. The head 41 incorporating the drive section 43a is disposed on the center pad 71. FIG. 4 is an upper surface view showing a first example of a configuration of the slider 51 according to the present embodiment. The slider 51 has, on the surface opposite to the disk 61, two drive sections 43b. FIG. 5 is a side surface view showing a first example of a configuration of the slider 51 according to the present embodiment.

Two read wires of the head 41, two write wires of the head 41, two drive wires of the drive section 43a, and two drive wires of the drive section 43b pass through a wire channel on the flexure 52 and a wire channel on the suspension 53 and are connected to the read channel 21. When a current is supplied to the drive section 43a by the read channel 21, the head 41 projects together with the drive section 43a to reduce the levitation height of the head 41. When a voltage is applied to the drive section 43b by the read channel 21, the slider 51 is warped, as denoted by dotted lines of FIG. 5, with the result that the levitation height of the head 41 is increased by the influence of the air flow between the slider 51 and disk 61.

A description will next be given of the drive sections 43a and 43b.

In the present embodiment, the drive section 43a is a heater (refer to, e.g., the techniques of Patent Documents 1 and 2) on the head 41, and drive section 43b is a piezoelectric element (refer to, e.g., the techniques of Patent Documents 3 and 4) on the slider 51. In addition, a piezoelectric element (refer to, e.g., the technique of Patent Document 6) on the suspension 53 and an electrostatic levitation method (refer to, e.g., the technique of Patent Document 5) are available. A description will be given here of features such as response speed, cost increase, power consumption, displacement, and levitation posture for each drive method.

The feature of the heater on the head 41 will firstly be described. The response speed is about several msec (which is decreased as power consumption is increased). The cost increase is small. The power consumption is increased up to 100 mW and a current must be applied during deformation. The displacement is about 10 nm at most. A variation of the levitation posture of the slider 51 is minute. The levitation posture can be controlled only in the direction in which the levitation height is reduced.

The feature of the piezoelectric element on the slider 51 is as follows. The response speed is about 10 μsec. The cost increases because of an additional process of incorporating the piezoelectric element in the head 41. The power consumption during operation is substantially 0, because of the drive voltage. The displacement can be increased up to about 100 nm. A variation of the levitation posture of the slider 51 is large.

The feature of the piezoelectric element on the suspension 53 is as follows. The response speed is about 1 msec. The cost increases because an attachment of the piezoelectric element to the suspension 53 may adversely affect the entire performance. The power consumption during operation is substantially 0, because of the drive voltage. The displacement can be increased up to about 1000 nm. A variation of the levitation posture of the slider 51 is large.

The feature of the electrostatic levitation method is as follows. The response speed is about 1 μsec. The cost increases because insulation is required. The power consumption during operation is substantially 0, because of the drive voltage. The displacement can be increased up to about 5 nm. A variation of the levitation posture of the slider 51 is small.

Next, operation of levitation height control processing performed by the read channel 21 will be described.

Figure 6:
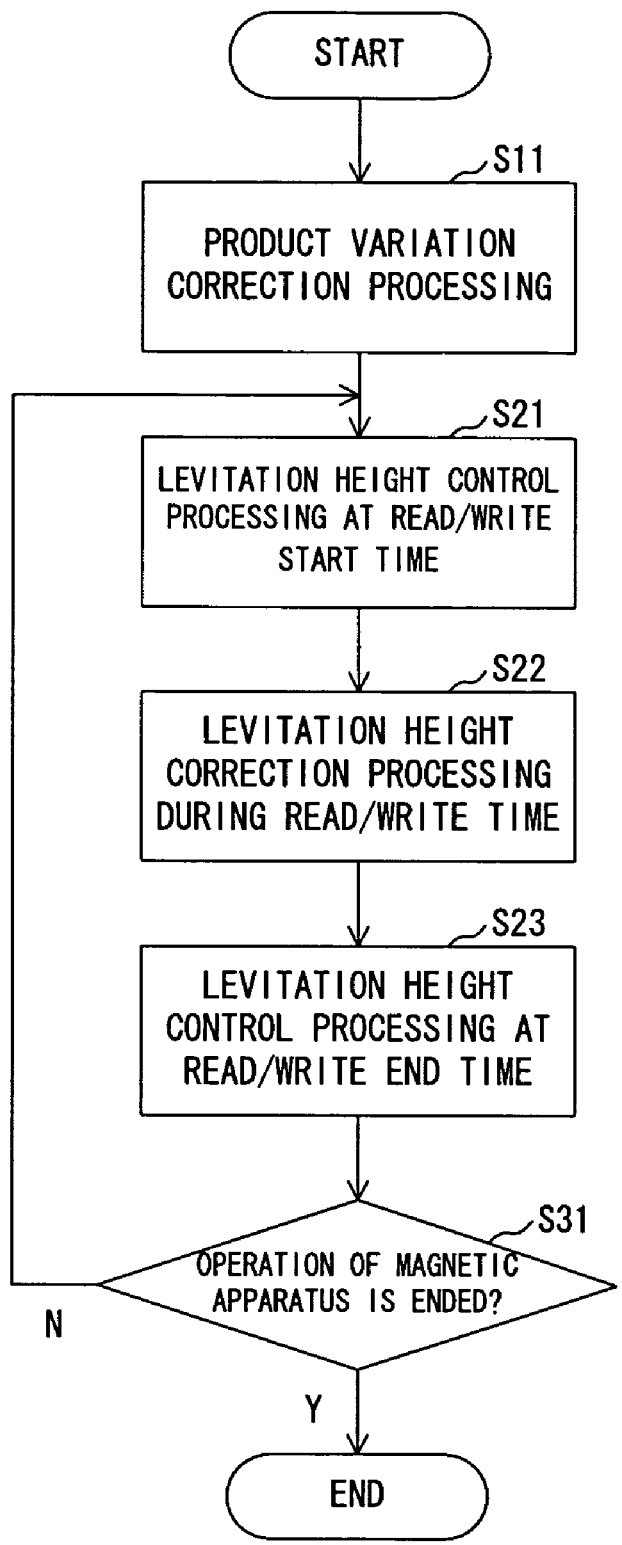
FIG. 6 is a flowchart showing an example of operation of levitation height control processing according to the present embodiment.

FIG. 6 is a flowchart showing an example of operation of the levitation height control processing according to the present embodiment. When the magnetic disk apparatus is started, the read channel 21 performs production variation correction processing (S11). Subsequently, when receiving a read or write instruction from the hard disk controller 11, the read channel 21 performs levitation height control processing at read/write start time (S21). Then, the read channel 21 performs levitation height correction processing during read/write time (S22). After the read or write operation has been completed, the read channel 21 performs levitation height control processing at read/write end time (S23). Thereafter, the read channel 21 determines whether the operation of the magnetic disk apparatus is ended (S31). If the apparatus is not ended (N in S31), the flow returns to step S21; on the other hand, if the apparatus is ended (Y in S31), this flow is ended.

Details of the production variation correction processing will next be described.

A levitation variation of the slider 51 occurs depending on the processing accuracy of the slider 51. Further, a sensitivity variation of the head 41 occurs depending on the process variation of the head 41. The production variation correction processing corrects the variation of levitation height due to the above production variations. The production variation correction processing requires a small variation of the levitation posture of the slider 51 and therefore uses the drive section 43a (heater). In the production variation correction processing, the read channel 21 controls the drive section 43a based on a previously measured levitation variation or sensitivity variation to correct the levitation height. In this processing, the electrostatic levitation method or piezoelectric element on the suspension 53 may be used in place of the heater.

Details of the levitation height control processing at read/write start time and levitation height control processing at read/write end time will next be described.

The levitation height control processing at read/write start time is performed for reducing the levitation height of the head 41 at the read/write start time, while the levitation height control processing at read/write end time is performed for increasing the levitation height of the head 41 at the read/write start time. According to the above processing, the head 41 is moved away from the disk while the read/write operation is not performed, increasing reliability of the magnetic disk apparatus. In this case, levitation height control processing at read/write start time and levitation height control processing at read/write end time require a large displacement of the head 41, so that the drive section 43b (piezoelectric element) is used. In the levitation height control processing at read/write start time, the read channel 21 controls the drive section 43b to reduce the levitation height to a predetermined level. Similarly, in the levitation height control processing at read/write end time, the read channel 21 controls the drive section 43b to increase the levitation height to a predetermined level. In the levitation height control processing at read/write start time and levitation height control processing at read/write end time, the piezoelectric element on the suspension 53 or heater may be used in place of the piezoelectric element on the slider 51.

Details of the levitation height correction processing during read/write time will next be described.

The levitation height correction processing during read/write time is performed for maintaining the levitation height to a given level against a levitation height variation due to a variation of the position in the radial direction, levitation height variation due to a variation of atmospheric pressure, levitation height variation due to surface roughness of the medium, and levitation height variation due to impact. In the levitation height correction processing during read/write time, the read channel 21 controls both the drive sections 43a and 43b to maintain the levitation height to a given level.

The levitation height variation due to a variation of radial direction position means that the levitation height of the head 41 at the inner circumference of the disk 61 differs from that at the outer circumference of the disk 61. The displacement in this case is as minute as 5 nm or less. In the correction processing for the levitation height variation due to a variation of radial direction position, the drive section 43a (heater) is used. In place of the heater, the electrostatic levitation method may be used.

The levitation height variation due to a variation of atmospheric pressure means that the levitation height of the head 41 varies due to influence of the height in use environment of the magnetic disk apparatus or the like. There is a need for the magnetic disk apparatus to be able to be used at a higher altitude of 3000 m. The levitation height needs to be increased at the time when atmospheric pressure is reduced due to higher altitude, involving a change of the levitation posture of the slider 51. Therefore, in the correction processing for the levitation height variation due to a variation of atmospheric pressure, the drive section 43b (piezoelectric element) that can control the levitation posture is used. In place of the piezoelectric element on the slider 51, the piezoelectric element on the suspension 53 or electrostatic levitation method may be used.

The levitation height variation due to surface roughness of the medium means that the levitation height of the head 41 varies due to waviness of the surface of the disk 61. Waviness of various cycles (mm-μm) exists on the medium surface. The surface roughness depends upon the cycle. In the case where the cycle is as large as about several mm, the roughness reaches up to several μm, while in the case where the cycle is as small as about several μm, the roughness is several nm. Assuming that the rotation speed of the disk 61 is constant, low response speed is sufficient for a large cycle, while high speed is required for a small cycle. Therefore, in the correction processing for the levitation height variation due to disk surface roughness, the drive section 43a (heater) is used for following a large cycle while the drive section 43b (piezoelectric element) is used for following a small cycle, making it possible to follow every shape of the medium surface.

In the correction processing for the levitation height variation due to medium surface roughness, a combination of the above mentioned heater and piezoelectric element on the slider 51 is effective in the case of using the disk 61 in which the deformation rate is comparatively reduced. In this case, the piezoelectric element on the suspension 53 may be used for following a large cycle, while the heater may be used for following a small cycle. In the case of using the disk 61 with a high deformation rate, the piezoelectric element on the slider 51 may be used for following a large cycle, while the electrostatic levitation method may be used for following a small cycle. Similarly, in this case, the piezoelectric element on the suspension 53 may be used for following a large cycle, while the electrostatic levitation method may be used for following a small cycle.

In the levitation height variation of the head 41 due to impact, the position of the head 41 may be shifted by about 100 nm at impact time. It is desirable that response speed of msec or less, a large displacement of about 100 nm, and the posture of the slide 51 can be controlled. Therefore, in the correction processing for the levitation height variation due to impact, the drive section 43b (piezoelectric element) is used. The levitation height variation due to impact is thus corrected to keep the levitation height of the head 41 and levitation posture of the slider 51 constant, preventing the head 41 from being brought into contact with the disk 61. In place of the piezoelectric element on the slider 51, the piezoelectric element on the suspension 53 or electrostatic levitation method may be used.

Figure 7:
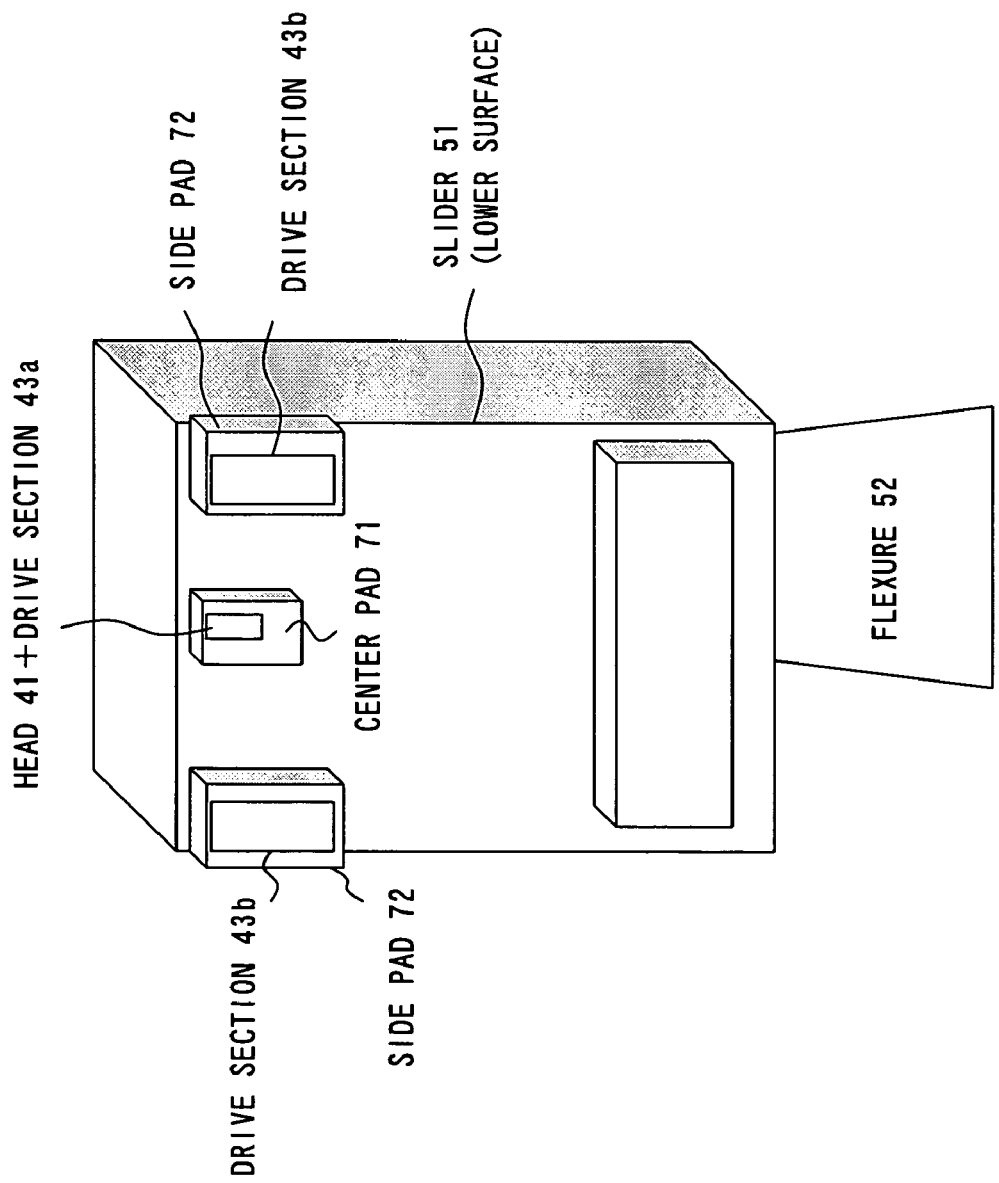
FIG. 7 is a lower surface view showing a second example of a configuration of the slider 51 according to the present embodiment.

The arrangement of the drive sections 43a and 43b may be changed. FIG. 7 is a lower surface view showing a second example of a configuration of the slider 51 according to the present embodiment. In FIG. 7, the same reference numerals as those in FIG. 3 denote the same or corresponding parts as those in FIG. 3, and the descriptions thereof will be omitted here. The drive section 43a is a heater (first drive method) and two drive sections 43b are thickness-mode piezoelectric elements (second drive method). In this case, the drive sections 43b are provided in the side pads 72 respectively.

As in the case of the configuration shown in FIG. 3, when a current is supplied to the drive section 43a by the read channel 21, the head 41 projects together with the drive section 43a to reduce the levitation height of the head 41. When a voltage in the polarization direction is applied to the drive section 43b by the read channel 21, the thickness of the drive section 43b is reduced with the result that the levitation height of the head 41 is reduced by the influence of the airflow between the slider 51 and disk 61. When a voltage opposite to the polarization direction is applied to the drive section 43b by the read channel 21, the thickness of the drive section 43b is increased, with the result that the levitation height of the head 41 is increased by the influence of the airflow between the slider 51 and disk 61.

The two drive sections 43b may be heaters (second drive method). As in the case of the configuration shown in FIG. 3, when a current is supplied to the drive section 43a by the read channel 21, the head 41 projects together with the drive section 43a to reduce the levitation height of the head 41. When a current is applied to the drive section 43b by the read channel 21, the thickness of the drive section 43b is increased with the result that the levitation height of the head 41 is increased by the influence of the airflow between the slider 51 and disk 61.

The head levitation control circuit according to the present embodiment can easily be applied to an information recording/reproduction apparatus and can increase the performance thereof. Examples of the information recording/reproduction apparatus according to the present embodiment include a magnetic disk apparatus, an optical disk apparatus, a magneto-optical disk apparatus, and the like.

What is claimed is:

1. An information recording/reproduction apparatus having a head that performs recording or reproduction of information on/from a recording medium, comprising:
    a first drive section that changes the levitation height of the head relative to the recording medium based on a first drive method;
    a second drive section that changes the levitation height of the head relative to the recording medium based on a second drive method different from the first drive method;
    a levitation height measurement section that measures the head levitation height; and
    a controller that controls the first and second drive sections based on the levitation height measured by the levitation height measurement section,
    wherein waviness of various cycles exists on a surface of the recording medium, and
    the controller allows the first drive section to follow waviness having a cycle of a first given range and allows the second drive section to follow waviness having a cycle of a second given range which is smaller than the first given range.

2. The information recording/reproduction apparatus according to claim 1, wherein
    the levitation height measurement section measures the levitation height based on a reproduction signal level output from the head.

3. The information recording/reproduction apparatus according to claim 2, wherein
    the controller controls the first drive section or second drive section to correct a variation of the levitation height due to a production variation of the head and a slider in which the head is provided.

4. The information recording/reproduction apparatus according to claim 1, wherein
    the controller controls the first drive section or second drive section to correct a variation of the levitation height due to a production variation of the head and a slider in which the head is provided.

5. The information recording/reproduction apparatus according to claim 1, wherein the controller controls the first drive section or second drive section to increase the levitation height by a predetermined level outside read/write operation time.

6. The information recording/reproduction apparatus according to claim 1, wherein
the controller controls the first drive section or second drive section to correct a variation of the levitation height due to a variation of atmospheric pressure.

7. The information recording/reproduction apparatus according to claim 1, wherein
the controller controls the first drive section or second drive section to correct a variation of the levitation height due to a variation of the head position in the disk radial direction.

8. The information recording/reproduction apparatus according to claim 1, wherein
the controller controls the first drive section or second drive section to correct a variation of the levitation height due to impact applied to the information recording/reproduction apparatus.

9. The information recording/reproduction apparatus according to claim 1, wherein
the controller controls a current to be supplied to the first drive section as well as controls a voltage to be supplied to the second drive section.

10. The information recording/reproduction apparatus according to claim 1, wherein
the second drive section has a higher response speed than the first drive section.

11. The information recording/reproduction apparatus according to claim 1, wherein
at least one of the first and second drive sections changes the levitation height of the head using heat expansion.

12. The information recording/reproduction apparatus according to claim 1, wherein
at least one of the first and second drive sections changes the levitation height of the head using piezoelectric distortion.

13. The information recording/reproduction apparatus according to claim 12, wherein
at least one of the first and second drive sections is a piezoelectric element that operates in a flexural mode, and the piezoelectric element is provided on the surface of the slider having the head on the opposite side of the head.

14. The information recording/reproduction apparatus according to claim 12, wherein
at least one of the first and second drive sections is a piezoelectric element that operates in a thickness mode, and the piezoelectric element is provided on a side pad formed on the slider having the head.

15. The information recording/reproduction apparatus according to claim 1, wherein
at least one of the first and second drive sections deforms a suspension that supports the slider having the head.

16. The information recording/reproduction apparatus according to claim 1, further comprising:
a slider that supports the head, wherein
the first drive section changes levitation the height of the head relative to the recording medium based on the first drive method and the first drive method includes changing a distance between the slider supporting the head and the head, and
the second drive section changes the levitation height of the head relative to the recording medium based on the second drive method and the second drive method causes at least one of the slider and a suspension for supporting the slider to deform.

17. An information recording/reproduction apparatus having a head that performs recording or reproduction of information on/from a recording medium, comprising:
a first drive section that changes the levitation height of the head relative to the recording medium based on a first drive method;
a second drive section that changes the levitation height of the head relative to the recording medium based on a second drive method different from the first drive method;
a levitation height measurement section that measures the head levitation height; and
a controller that controls the first and second drive sections based on the levitation height measured by the levitation height measurement section,
wherein the first drive section is so deformed as to reduce the levitation height of the head, and
the second drive section is so deformed as to increase the levitation height of the head.

18. A head levitation height control method that controls the levitation height of a head that performs recording or reproduction of information on/from a recording medium, comprising:
a levitation height measurement step that measures the head levitation height; and
a control step that controls the head levitation height relative to the recording medium with a first drive section based on a first drive method as well as controls the head levitation height relative to the recording medium with a second drive section based on a second drive method different from the first drive method,
wherein waviness of various cycles exists on a surface of the recording medium, and
the control step allows the first drive section to follow waviness having a cycle of a first given range and allows the second drive section to follow waviness having a cycle of a second given range which is smaller than the first given range.

19. The head levitation height control method according to claim 18, wherein
the control step
changes the levitation height of the head relative to the recording medium based on the first drive method and the first drive method includes changing a distance between a slider supporting the head and the head, and
changes the levitation height of the head relative to the recording medium based on the second drive method and the second drive method causes at least one of the slider and a suspension for supporting the slider to deform.

20. A head levitation control circuit that controls a levitation height of a head that performs recording or reproduction of information on/from a recording medium, comprising:
a first drive section that changes the levitation height of the head based on a first drive method;
a second drive section that changes the levitation height of the head based on a second drive method different from the first drive method;
a levitation height measurement section that measures the head levitation height; and
a controller that controls the first and second drive sections based on the head levitation height measured by the levitation height measurement section,
wherein waviness of various cycles exists on a surface of the recording medium, and the controller allows the first drive section to follow waviness having a cycle of a first given range and allows the second drive section to follow waviness having a cycle of a second given range which is smaller than the first given range.

21. The head levitation control circuit according to claim 20, wherein
the first drive section changes the levitation height of the head based on the first drive method and the first drive method includes changing a distance between a slider supporting the head and the head, and
the second drive section changes the levitation height of the head based on the second drive method and the second drive method causes at least one of the slider and a suspension for supporting the slider to deform.

* * * * *